United States Patent [19]
Hutchinson

[11] Patent Number: 5,257,563
[45] Date of Patent: Nov. 2, 1993

[54] APPARATUS FOR SHARPENING SAW BLADES

[76] Inventor: Ben M. Hutchinson, 40 Glenview Road, Mooloolah, Queensland 4553, Australia

[21] Appl. No.: 749,169

[22] Filed: Aug. 23, 1991

[30] Foreign Application Priority Data
Aug. 27, 1990 [AU] Australia .................... PK1970

[51] Int. Cl.$^5$ ............................................ B23D 63/16
[52] U.S. Cl. .................................... 76/40; 76/80.5; 76/77
[58] Field of Search ................ 76/37, 40, 75, 77, 80.5

[56] References Cited

U.S. PATENT DOCUMENTS

| | | | |
|---|---|---|---|
| 3,779,103 | 12/1973 | Silvey | 76/40 |
| 4,299,142 | 11/1981 | Kaye | 76/40 |
| 4,762,027 | 8/1988 | Fagiolini | 76/40 |

Primary Examiner—Roscoe V. Parker
Attorney, Agent, or Firm—Douglas W. Robinson

[57] ABSTRACT

A sharpening apparatus (10) is disclosed. The apparatus (10) has a pivot arm (18) for pivotal movement about shaft (21) extending transversely of the apparatus. The location of shaft (21) is variable to suit a variety of hook angles of the blade (33)

24 Claims, 4 Drawing Sheets

APPARATUS FOR SHARPENING SAW BLADES

BACKGROUND

This invention relates to an apparatus for sharpening saw blades. In particular the invention relates to an apparatus for sharpening band saw, frame saw or circular saw blades.

The invention will be described by way of example with reference to sharpening band saw blades although, as mentioned above, it may equally be employed for sharpening other saw blades. The apparatus of the invention may also be used for manufacturing saw blades from blade material.

The teeth on a saw blade have a tip portion, a leading edge or front portion and a trailing or back portion. Gullet and throat portions are typically located between the back portion and front portion of the tooth. The angle the front portion makes to the vertical is called the hook angle and different hook angles are adopted for cutting different materials.

A blade may have a plurality of teeth with each tooth of the same profile. The teeth may be square cut or bevelled to one side or other of the blade. In some instances the teeth may be bevelled on both sides and have a pointed tip. Where the teeth are square cut the tip may be flat and have a cutting edge extending normally to the blade. It is not unusual for a blade to have a series of differently shaped teeth alternating in a repeating sequence along the blade. In addition, blades may have a variety of pitch distances between teeth.

Prior machines for sharpening blades have a cutting head with a grinding disk. The head was reciprocally movable either by the provision of a slide or an arm pivoted to the machine. The pivot axis was generally parallel to the side faces of the blade or the head was moved reciprocably relative to the blade during grinding.

In such machines the mechanism for adjustment to achieve different hook angles or tooth profile (square, single bevel or double bevel) was difficult to achieve and hence the machines were complex and expensive.

U.S. Pat. No. 4,018,109 discloses a machine where the cutting head was mounted for movement on a slide. That specification is primarily concerned with the manner in which blades with wide pitch distances and variations in pitch distances could be advanced through the machine.

U.S. Pat. No. 4,018,107 discloses another machine for sharpening saw blades having teeth of alternative high and low profiles.

U.S. Pat. Nos. 3,960,037, 4,136,585 and 4,436,000 are exemplary of machines where the head is reciprocated transversely of the blade to grind the teeth of the blade.

SUMMARY OF THE INVENTION

It is an object of the invention to provide an apparatus for sharpening saw blades wherein hook angle adjustments can easily be made.

According to the invention there is provided an apparatus for sharpening a saw blade including a sharpening head mounted on a pivot arm for pivotal movement about an axis transverse to the apparatus and the blade, the position of the head along the pivot arm and/or the location of the pivot axis of the pivot arm being adjustable to suit a variety of hook angles of teeth of the blade.

The adjustment of the location of the pivot axis may be discretely variable or infinitely variable between two extreme positions. Where a discrete variation is possible, the pivot arm may be selectively fixed relative to the apparatus in one position selected from a plurality of positions. This may be achieved by having a series of fixing apertures provided in side plates of the apparatus. Alternatively the plates may be provided with slots to effect infinite adjustability for hook angle between end extremes of the slots.

The apparatus may include a blade feed assembly including a feed finger. The feed finger may contact the blade either upstream or downstream of the sharpening head. It is preferred that the feed assembly be adjustable to time the feeding in synchronism with the movement of the sharpening head. Adjustment is achieved by either advancing or retarding the position of the feed finger relative to a downstream end of the apparatus.

The pivotal movement of the pivot arm and movement of the feed assembly may be achieved by a common drive. The drive may include a drive shaft having a first cam for causing pivotal movement of the pivot arm and a second cam for reciprocating the feed assembly. The cams may cause direct movement of cam followers or alternatively intermediate followers may be transposed between the pivot arm and the feed assembly and the respective cams. In one embodiment the drive may comprise a drive shaft which is either manually driven or driven by a drive motor. The intermediate follower between the pivot arm and the first cam may comprise a follower arm pivotally mounted to the apparatus and adapted to contact the first cam. A feed follower arm may comprise an intermediate follower between the feed assembly and the second cam. The tooth position may be achieved by altering the position between the feed finger and the feed follower arm. Preferably a translating arm is transposed between the feed follower arm and the feed finger and tooth position adjustment is achieved by altering the position of the feed finger relative to the translating arm.

The depth to which the sharpening head may move is also preferably adjustable. An adjustment may be achieved by a screw between the pivot arm and the first cam or the follower arm.

The blade being sharpened may be biased against or otherwise held relative to the apparatus. Biasing means may be provided by a spring. Preferably a leaf spring is employed.

The blade may locate relative to a support to hold the blade in a desired position for sharpening. A support frame may be employed. The support frame may be adjustable to cater for blades of differing sizes.

BRIEF DESCRIPTION OF DRAWINGS

The invention will now be described by way of example with reference to the drawings in which.

DETAILED DESCRIPTION

Figures 1, 3:
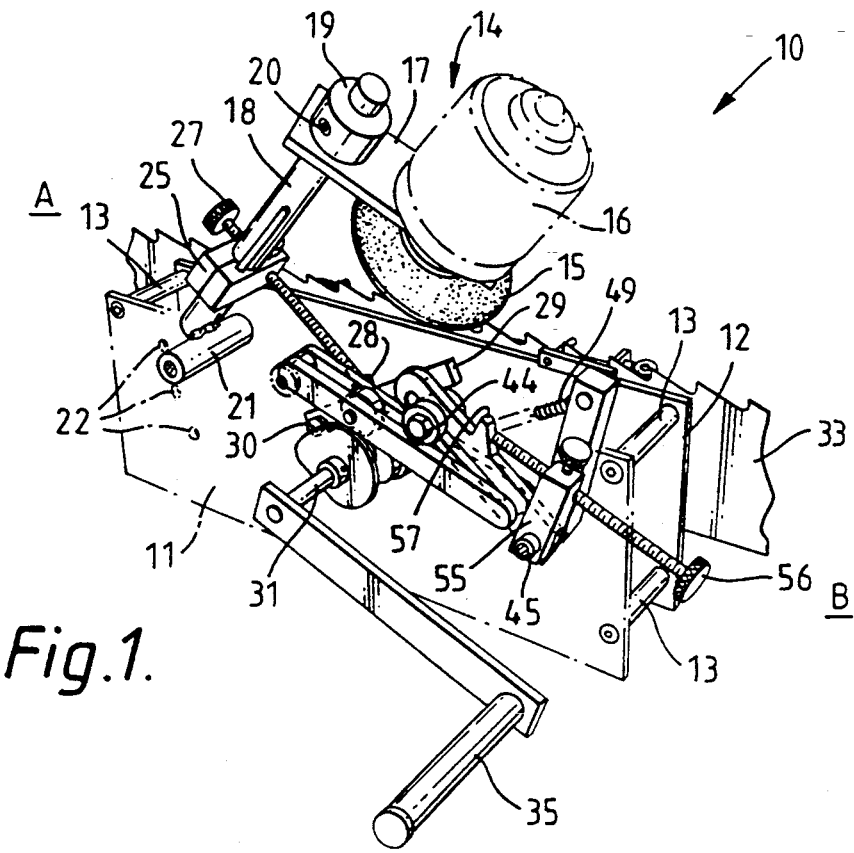
FIG. 1 is a perspective view of an apparatus according to an embodiment of the invention.
FIG. 3 is a perspective view of the apparatus with a side plate removed for the sake of clarity.
Figure 2:
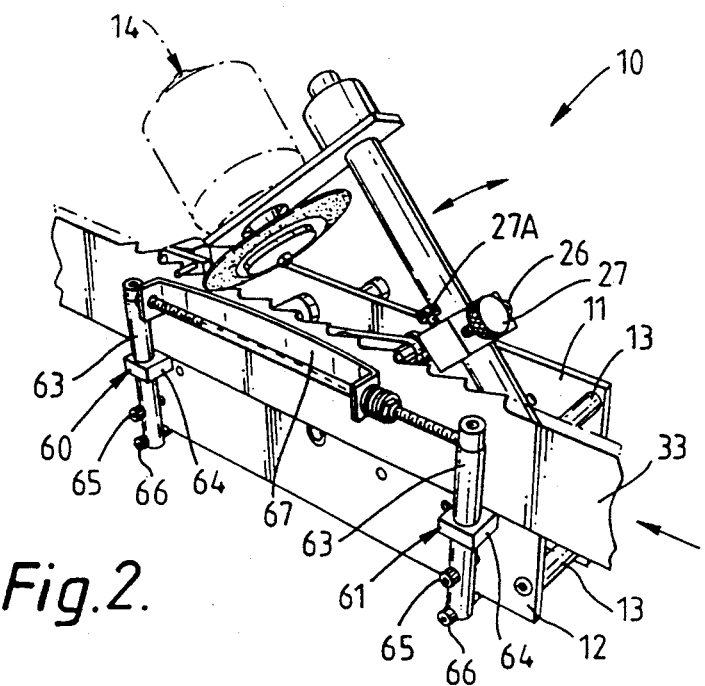
FIG. 2 is a perspective view of the apparatus of FIG. 1 shown from the rear.

With reference to FIGS. 1, 2 and 3, the apparatus 10 has front side plate 11 and a rear side plate 12 coupled together by spacing elements 13. End A of the apparatus is an upstream end while end B is a downstream end. A sharpening head 14 is secured to the plates 11, 12 for pivotal movement relative thereto about an axis normal to the plates. The head 14 has a sharpening disc or wheel 15 driven by motor 16. Motor 16 is mounted to mounting arm 17 which in turn is mounted to one end of pivot arm 18. If desired, the mounting arm 17 can be selectively fixed at desired locations along pivot arm 18 or may simply be permanently fixed at one location to pivot arm 18. In the drawings collar 19 is welded to mounting arm 17 and a grub screw 20 fixes arm 17 to pivot arm 18. In this way not only may the location of the mounting arm 17 along pivot arm 18 be altered but so can its angular relationship relative to the pivot arm 18.

Pivot arm 18 has a bush or sleeve 21 fixed to one end and a pivot pin may fix this sleeve to the plates 11, 12 to enable pivot arm 18 to pivot. As shown in the figures, plates 11 and 12 have a plurality of mounting apertures 22 and sleeve 21 may be fixed in a desired position relative to the plates. Thus, the location of the pivot axis for pivot arm may be selected as desired to achieve a desired hook angle. The location of apertures 22 may be chosen to give hook angles of 8, 12 and 16 degrees for example.

Slide block 25 is fixed to arm 18 and its position may be varied. Grub screw 26 facilitates this variation in position. A depth adjustment member in the form of adjusting screw 27 extends through block 25 and is received in a threaded aperture in block 25. Grub screw 27A locks screw 27 in a desired position. The free end 28 of screw 27 abuts against cam follower arm 29 pivotally mounted at 30 to plates 12 and 13.

An operating spindle or shaft 31 extends across the apparatus 10 and has mounted to it a cam 32 against which follower arm 29 rests and cam 33 against which a feed follower arm 34 rests. Shaft 31 is journalled for rotation by apertures in plates 11, 12 and may either be driven by a motor or, as is the case in the embodiment illustrated, is manually rotated by crank handle 35.

Follower arm 29 is caused to pivot by cam 32. The angle of the arc through which arm 18 is caused to pivot is governed by the position of slide 25 along arm 18 and hence the location from pivot 30 at which end 28 abuts follower arm 29. The further from pivot 30 at which end 28 contacts arm 29 the greater the arc angle. Screw 27 controls the lower limit of the arc angle and hence the depth to which wheel 15 cuts relative to blade 33. If the screw 27 is turned to lift arm 18 the depth of cut is decreased. To increase the depth of cut the screw 27 is turned to lower arm 18. This facilitates adjustment for wear of wheel 15.

The blade feed assembly includes feed follower arm 34 pivoted at 40 to plate 11. Intermediate ends of arm 34 is cam follower 41. Cam follower 41 is a roller adapted to run over cam 33. Feed translating arm 42 has a slot 43 relative to which roller 44 is mounted. The location along slot 43 at which roller 44 is mounted is adjustable. The further that roller 44 is from follower 41 the greater the arc through which translating arm 42 moves.

Translating arm 42 is fixed to shaft 45 journalled for rotation in apertures in plates 11, 12. Shaft 45 also has mounted to it feed member 46. Member 46 is fixed to shaft 45 and the distal end of member 46 carries a finger 47 with a pin 48 engagable with teeth on blade 33. Member 46 is biased towards upstream end A of the apparatus 10 by spring 49. Finger 47 assumes a position against the blade under the influence of gravity. Adjustment arm 55 is fixed relative to shaft 45 and remains stationary relative to the shaft as does member 46. Adjustment screw 56 is screw threaded relative to arm 55 and has a free end which abuts against stop 57 on translating arm 42. Adjustment screw 56 may be locked in a desired position by set screw 58. The position of screw 56 governs timing of the movement of feed member 46 relative to the wheel 15 and allows for adjustment to cater for wear of wheel 15. Screw 56 enables pin 48 to be moved towards or away from downstream end B of the apparatus.

As shown in FIG. 2 the blade 33 is supported on supports 60, 61. These supports are adjustable to accommodate blades of a variety of sizes. Each support has a post 63 which locates in a support block 64. Screw 65 is threaded into plate 12 and screw 66 locks the post and hence the block against plate 12. Spring 67 extends between posts 63 and biases the blade 33 against plate 12.

Figure 4:
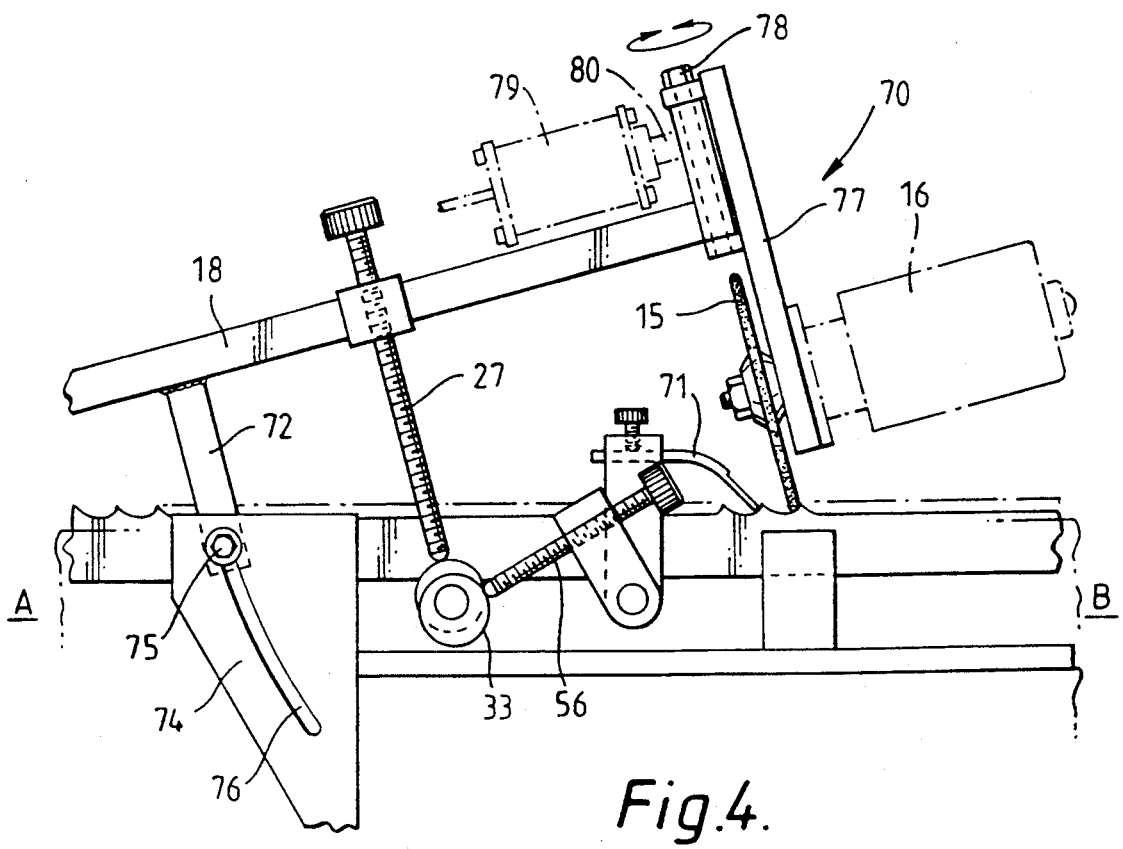
FIG. 4 is a side view of an alternative embodiment of a sharpening apparatus according to the invention.

FIG. 4 shows an alternative apparatus 70 to that shown in FIGS. 1 to 3. Like numerals have been employed for the components. In this Figure the feed assembly is located upstream of the wheel 15 rather than downstream as in FIGS. 1 to 3. The feed assembly has a hooked finger 71 which engages the teeth of the blade to move the blade downstream. In this embodiment screw 56 directly engages cam 33.

Arm 18 has an extension 72 fixed to plate 74 by bolt 75. Bolt 75 is received in a slot 76 and extension 72 pivots about bolt 75. The location of bolt 75 relative to slot 76 may be adjusted to enable sharpening of blades with a variety of hook angles. Screw 27 controls the depth to which wheel 15 may move.

Motor 16 is mounted to plate 77 which is free to pivot about pivot axis 78. Actuator 79 has a rod 80 which engages plate 77 at a location laterally displaced from pivot axis 78. Actuator 79 can be controlled to pivot plate 77 and thus sharpen teeth which are alternately bevelled or straight cut. The wheel 15 can be displaced from the pivot axis by the use of spacers or shims. In this way a height difference between straight cut teeth and bevelled cut teeth can be achieved.

Figure 5:
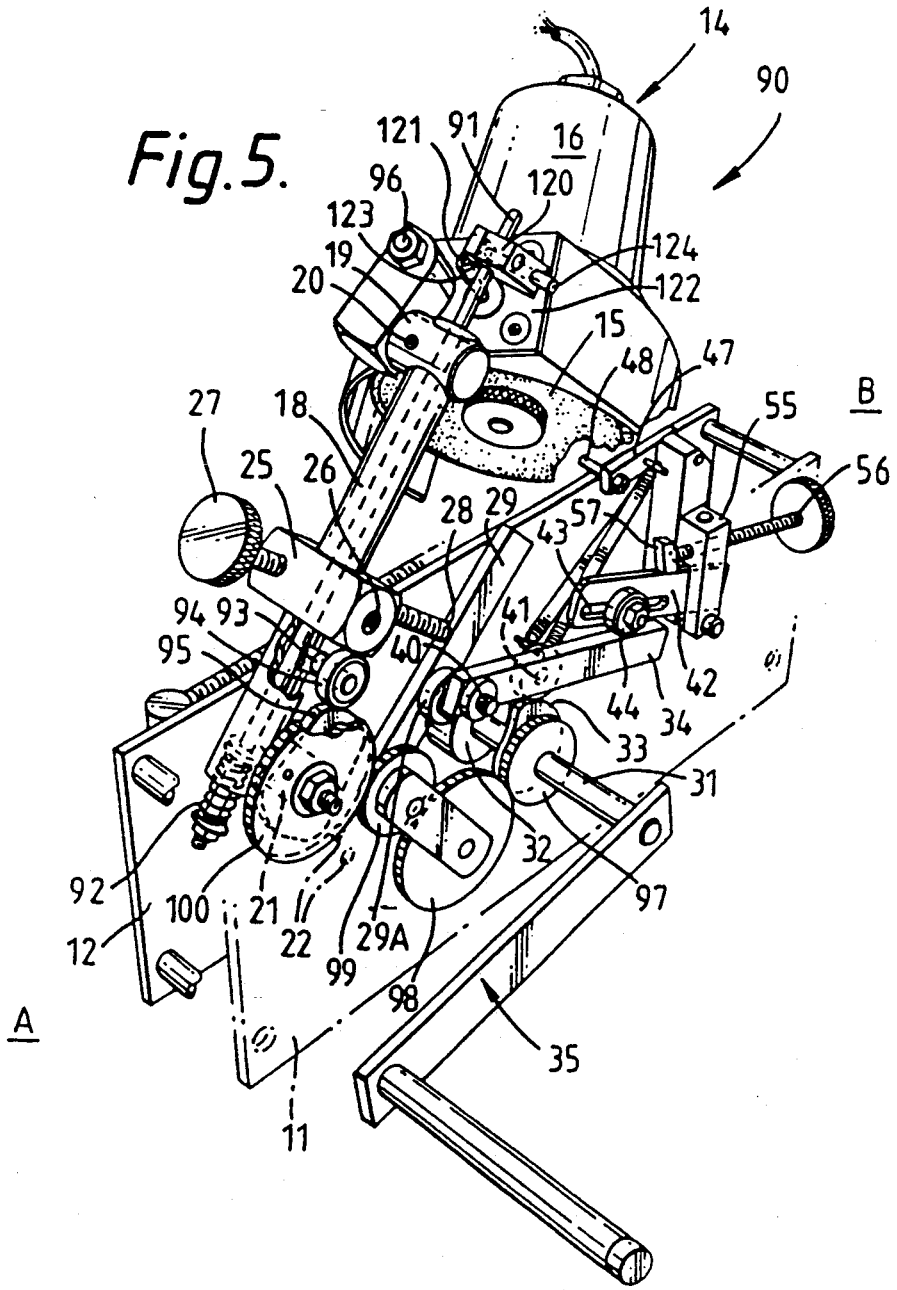
FIG. 5 is a perspective view of an apparatus according to another embodiment of the invention.

FIG. 5 shows an alternative apparatus 90 to that of FIGS. 1 to 3 and FIG. 4. Like numerals to that appearing in FIGS. 1 to 3 are used for like components in FIG. 5.

The apparatus of FIG. 5 has side plates 11 and 12 spaced apart by elements 13. End A is an upstream end of the apparatus 90 while end B is a downstream end. Sharpening head 14 is secured to plates 11, 12 for pivotal movement about an axis extending along sleeve 21 and normal to the plates. The head 14 has a sharpening disc or wheel 15 driven by motor 16. Head 14 is mounted to arm 18 and the sleeve 21 secured to the arm 18 can be selectively secured in selected apertures 22 to achieve variation in hook angle. Collar 19 is movable along arm 18 and may be locked in a desired position along the arm by screw 20.

Side block 25 is fixed to arm 18 and its position may be varied. Screw 26 facilitates the locking of block 25 in the desired position along the arm. Depth adjusting screw 27 extends through block 25 and has a free end 28 abutting cam follower arm 29. Arm 29 is pivotally mounted to plate 12 and has a roller 29A which engages cam 32 on shaft 31. Also mounted to shaft 31 is cam 33.

Feed follower arm 34 is pivoted to plate 11 at 40. Follower 41 is mounted to arm 34. Follower 41 runs on cam 33.

Translating arm 42 is mounted to shaft 45 and has a slot 43 along which follower 44 may be fixed. Pivotal movement of arm 42 causes adjustment arm 55 to move. Arm 42 has a stop 57 against which adjustment screw 56 locates. Screw 56 enables the relative angular position between arm 42 and 55 to be altered to enable the feed for the blade to be adjusted to take into account wear of wheel 15. Member 46 is fixed relative to arm 55 and carries finger 47 and pin 48.

Arm 18 is hollow and has a rod 91 extending through it. The rod 91 is biased outwardly of the lower end of the arm 18 by spring 92. Part of the arm 18 is slotted and carrier arm 93 for cam follower 94 projects through the slot. Follower 94 runs on cam 95 fixed to shaft 21. Rotation of cam 95 causes arm 93 to move in the slot and enables the rod 91 to be reciprocated relative to the arm 18. This action causes the head 14 to pivot about axis 96 to alternately bevel the teeth on the blade in one direction and then in the other direction.

The end of rod 91 remote from spring 92 is fixed relative to block 120. Post 121 is fixed to plate 122 and carries a sleeve 123 from which a pin 124 extends at right angles. Pin 124 is freely received in and movable relative to block 120.

Rotation of crank 35 causes gear 97 to rotate idler gears 98, 99 and then to rotate gear 100 to cause cam 95 to rotate. In this way the pivoting of arm 18 is in time with feeding of the blade and movement of the head for bevelling the teeth on the blade. The gearing and the profile of cam 95 can be chosen such that the teeth are alternately bevelled or such that a bevel in one direction, a straight finish and a bevel in the other direction is achieved on three consecutive teeth.

Figure 6:
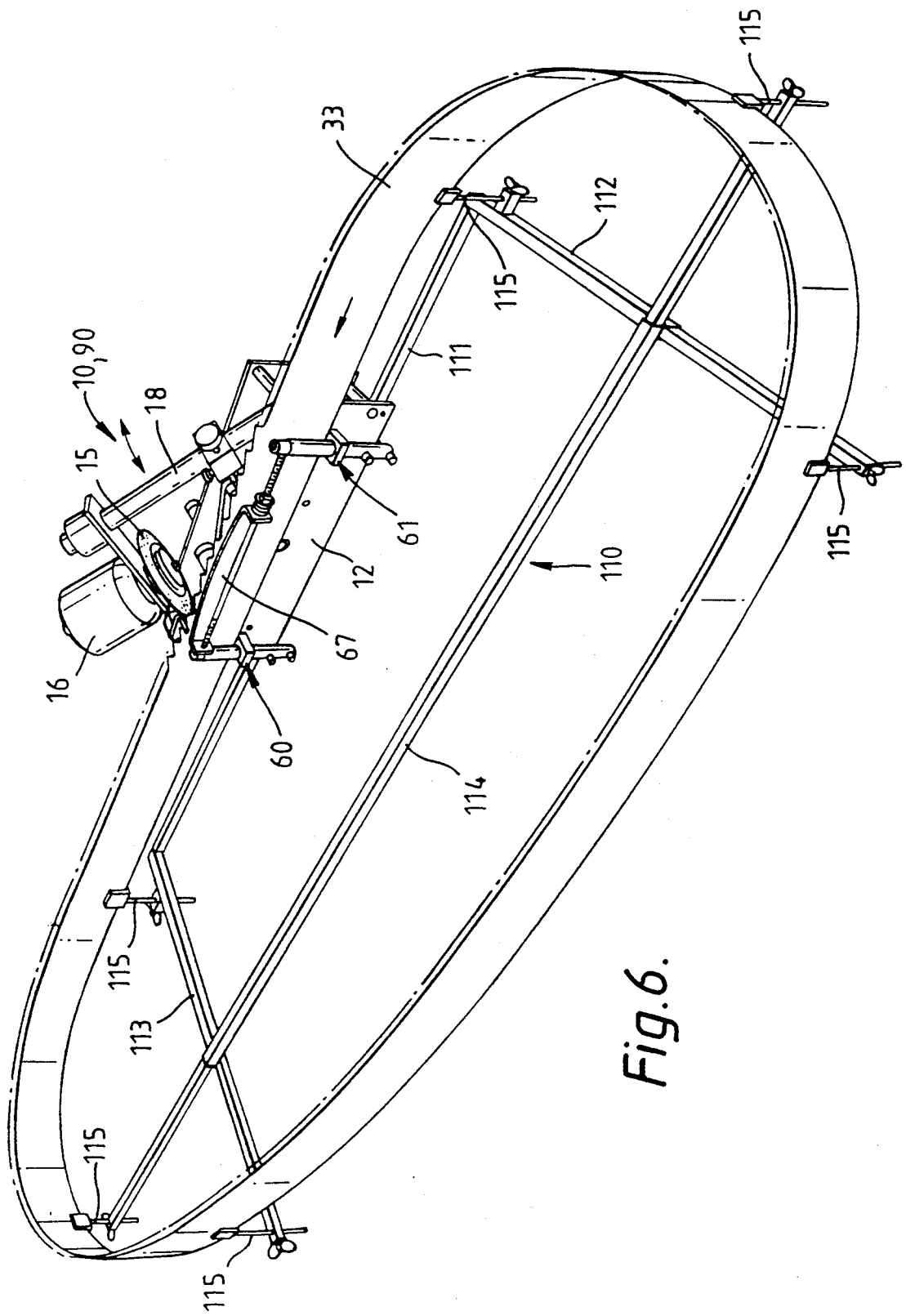
FIG. 6 is a perspective view of an apparatus of the invention and a blade support frame.

FIG. 6 shows how the apparatus 10 of FIGS. 1 to 3 or the apparatus 90 of FIG. 5 support the blade for grinding. Stand 110 has a longitudinal member 111 secured to plate 12. Two telescoping transverse members 112, 113 extend from ends of member 111. Telescoping longitudinal member 114 extends parallel to member 111. Support posts 15 complete the stand.

Operation of the apparatus of FIG. 5 is as follows.

Hook angle adjustment is achieved by mounting the shaft 21 about which the pivot arm 18 pivots to selected apertures 22 of the series of apertures in the plates 11, 12. Typically hook angles of 8°, 12°, 16°, 20°, 25° or 30° are possible.

Tooth stroke or pitch adjustment is achieved by loosening follower 44 and repositioning it in the slot 43. The length of the feed stroke can alter the tooth shape. To help with this cam 33 is provided with a slight dwell just after the finger 48 begins to advance.

The co-ordination of cam 33 and cam 32 produces the tooth shape. Adjustment is achieved by locking the cams together in a desired angular relationship.

Tooth height is adjusted by the amplitude of the head 14. Adjustment is achieved by moving slide 25 along arm 18. The further slide 25 is from shaft 21 the greater the amplitude.

To set up the apparatus for use, the desired hook angle is selected. The blade is fixed to the stand 110. The blade is positioned between spring 67 and plate 12. The height of the blade is adjusted so that the bottom of the gullets of the teeth are about 2 mm above the top edge of the plate 12. The spring 67 is then tightened to offer slight resistance to advancement of the blade. The amount of material removed from the front face of the tooth is adjusted by screw 56. The material removed from the gullet and back of the tooth is adjusted with screw 27. Once adjusted crank 35 can be rotated.

While the invention has been described with reference to sharpening teeth on a blade, the apparatus may be equally employed for grinding and forming teeth on a blade in the first instance.

With the apparatus of the invention, adjustment to cater for a variety of hook angles is readily achieved by simply adjusting the location of the pivot axis of the pivot arm either discretely as shown in FIGS. 1 to 3 or infinitely adjustable as shown in FIG. 4. In addition to adjustment in this way hook angle adjustment is also possible by altering the position of the cutting wheel along the pivot arm.

I claim:

1. An apparatus for sharpening a saw blade including a sharpening head mounted on a pivot arm, said arm being mounted for pivotal movement about an axis transverse to the apparatus and the blade, the head being pivotally mounted to the arm allowing for coordinated oscillation of the head from side to side about an axis transverse to the arm, the oscillation of the head being controlled by an actuating rod extending parallel to the arm, one end of the rod being pivotally attached to the head and the rod being reciprocated in a direction extending along the rod by a control cam spaced from the head, the oscillation of the head enabling teeth on the blade to be bevelled in various directions, the position of the pivot axis of the arm being adjustable to suit a variety of hook angles of teeth of the blade.

2. The apparatus of claim 1 including a base to which the pivot arm is mounted for pivotable movement.

3. The apparatus of claim 2 wherein said base includes at least one arcuate slot and the arm can be secured to pivot about a selected location along the slot.

4. The apparatus of claim 2 wherein said base includes a plurality of spaced mounting apertures and said pivot arm can be mounted relative to selected apertures.

5. The apparatus of any one of claims 1 to 4 including a blade feed assembly having a feed finger engageable with the teeth of the blade.

6. The apparatus of claim 5 wherein pivotal movement of the pivot arm and movement of the feed assembly is achieved from a common drive.

7. The apparatus of claim 6 wherein said drive has a first cam causing pivotal movement of the pivot arm and for reciprocating the feed assembly.

8. The apparatus of claim 6 wherein said drive has a first cam causing pivotal movement of the pivot arm and a second cam for reciprocating the feed assembly.

9. The apparatus of claim 7 including a pivotally mounted follower arm engagement with the first cam.

10. The apparatus of claim 9 including an adjustment screw extending between the pivot arm and the follower arm enabling the angle between the pivot arm and the follower to be adjusted.

11. The apparatus of claim 10 wherein the location at which the adjustable screw is mounted to the pivot arm is adjustable to vary amplitude of the pivot arm.

12. The apparatus of claim 11 wherein said adjustment screw is received in a block slidably mounted on the pivot arm.

13. The apparatus of claim 7 wherein said feed assembly includes a pivotally mounted feed follower arm having a feed cam follower therein engageable with a cam.

14. The apparatus of claim 13 wherein said feed assembly includes a translating arm pivotally mounted for pivotal movement and having a cam follower adjustably mounted thereto for movement along the translating arm and engageable with the feed follower arm.

15. The apparatus of claim 14 wherein said translating arm has a stop.

16. The apparatus of claim 15 wherein said feed assembly includes a feed member pivotally mounted to a feed shaft and an adjustment screw extending between the feed member and the stop for adjusting the relative position between the feed member and the translating arm.

17. The apparatus of claim 16 wherein said feed member is biased towards the translating arm.

18. The apparatus of claim 16 wherein said feed finger is carried by the feed member.

19. The apparatus of claim 17 wherein said feed finger is carried by the feed member.

20. The apparatus of claim 1 wherein said pivot arm is hollow and receives the actuating rod for pivoting the head relative to the pivot arm.

21. The apparatus of claim 20 including a cam follower mounted to the actuating rod, said pivot arm being mounted to a shaft, a cam member on said pivot arm shaft engageable by the cam follower mounted to the actuating rod for reciprocating the rod relative to the pivot arm.

22. The apparatus of claim 20 or 21 wherein said rod is biased towards one end of the pivot arm.

23. The apparatus of claim 21 when appended to claim 7 including gearing between said drive shaft and said pivot arm shaft whereby rotation of said main shaft causes rotation of said cam member on pivot arm shaft.

24. An apparatus for sharpening a cutting means including a sharpening head mounted on a pivot arm, said arm being mounted for pivotal movement about an axis transverse to the apparatus and the cutting means, the head being pivotally mounted to the arm allowing for co-ordinated oscillation of the head from side to side about an axis transverse to the arm, the oscillation of the head being controlled by an actuating rod extending parallel to the arm, one end of the rod being pivotally attached to the head and the rod being reciprocated in a direction extending along the rod by a control cam spaced from the head, the oscillation of the head enabling teeth on the cutting means to bevelled in various directions, the position of the pivot axis of the arm being adjustable to suit a variety of hook angles of teeth of the cutting means.

* * * * *